Patented Mar. 18, 1952

2,589,657

UNITED STATES PATENT OFFICE 2,589,657

MODIFIED SHORT OIL ALKYD RESINS

Laszlo Auer, South Orange, N. J.

No Drawing. Application July 30, 1946,
Serial No. 687,204

13 Claims. (Cl. 260—15)

Alkyd resins are polyhydric alcohol esters of polycarboxylic acids. Oil modified alkyd resins contain as an additional ingredient polyhydric alcohol esters of fatty acids. The fatty acids used in the manufacture of oil modified alkyd resins, are fatty acids of natural oils and fats and of synthetic oils and fats. The fatty acids and the polycarboxylic acids of the alkyd resins may form mixed esters, i. e. they may be simultaneously combined to the same polyhydric alcohol molecule.

A short oil alkyd resin, for the purposes of this specification, contains at least 45% and preferably at least 50% polybasic acid ester, the remaining percentage being the polyhydric alcohol ester of the fatty acids.

Ethyl cellulose is an ether of cellulose and is marketed with varying ethoxy content and in varying viscosity grades. The ethoxy content of the ethyl cellulose governs hardness of the films formed and to a great extent its compatibility with resins and plasticizers.

Ethyl cellulose is a very valuable film former, but it is incompatible with many resins and plasticizers. All forms of commercial ethyl cellulose now on the market, are incompatible with short oil alkyd resins, and also incompatible with most of the commercially available organic solvent soluble urea formaldehyde and melamine formaldehyde resins.

It occurred to applicant that very valuable coating compositions may be obtained by forming a compatible mixture of ethyl cellulose and short oil alkyd resins. A great deal of work has been put into solving this difficult problem through a considerable period, yielding finally full success.

A new type of resin has been prepared by co-condensing ethyl cellulose and the ingredients forming the short oil alkyd resins. By adding the ethyl cellulose to the ingredients forming the short oil alkyd resins before or during the alkyd resin formation, and adjusting the reaction conditions in a proper way, fully compatible mixing of the ingredients is achieved and the resin obtained forms clear films, with no signs of turbidity or milkiness.

Incompatibility of short oil alkyd resins with ethyl cellulose may manifest in various ways. If their solutions are mixed, a gel structure is formed, which does not flow clearly and lumps may remain on the wall of the container, after it is tipped and permitted to settle. The mixture further is turbid in solution and not clear and transparent. The films obtained from these solutions are not clear. They are cloudy or milky or they show fish scale like opaque particles distributed in clearer portions of the film. Such films are not homogeneous and therefore have little commercial value.

If the ethyl cellulose is added to the non-volatile incompatible short oil alkyds and the mixture is heated, the resulting product yields similar solutions and similar films, as described above for the mixtures of the solutions of these materials.

Organic solvent soluble urea formaldehyde or melamine formaldehyde resins (which are usually butyl or capryl modified), when added to short oil alkyd resins, form usually clear mixtures and clear films. However, if ethyl cellulose is incorporated in any conventional way into this mixture or into the short oil alkyd or into the urea type resin before the mixture is made, the final mixture of the three ingredients will behave like the short oil alkyds themselves behave with the ethyl cellulose.

OIL MODIFIED ALKYD RESINS

The oil modified alkyd resins have generally speaking three components: (1) polycarboxylic acids or their anhydrides, (2) high molecular monocarboxylic acids and (3) polyhydric alcohols.

Polycarboxylic acids

As polycarboxylic acid ingredients of alkyd resins the following are given as examples: Phthalic acid, maleic acid, succinic acid, malic acid, tartaric acid, fumaric acid, citric acid, adipic acid, sebacic acid, azelaic acid, suberic acid, etc., or anhydrides of such acids.

High molecular monocarboxylic acids

As high molecular monocarboxylic acid ingredients of alkyd resins the following are given as examples: Linseed oil fatty acids, China-wood oil fatty acids, perilla oil fatty acids, oiticica oil fatty acids, dehydrated castor oil fatty acids, sunflower oil fatty acids, soyabean oil fatty acids, cottonseed oil fatty acids, corn oil fatty acids, olive oil fatty acids, fatty acids of fish oil (train oils), fatty acids of hydroxylated oils, such as castor oil, rosin acids, natural resin acids in general, fused Congo acids, etc.

Synthetic fatty acids may also be used. Such acids are made by oxidation of petroleum hydrocarbons, for instance. The Fischer-Tropsch acids of $C_9$ to $C_{14}$ may be used as starting materials of alkyd resins.

Polyhydric alcohols

As polyhydric alcohol ingredients of alkyd resins, the following list may be given as examples: Glycols, glycerine, pentaerythritol, mannitol, sorbitol, etc.

Instead of using fatty acids as such for the fatty acid ingredients of the alkyd resins, fatty oils or fats could be used fully or in part in the alkyd resin formation to replace the fatty acids. If fatty oils or fats are used as the sole fatty acids supplying starting materials, it may be of advantage to pre-react the fatty oils or fats with the additional polyhydric alcohol constituent and to add the polybasic acid constituent in a subsequent step. In such an event the quantity of the polyhydric alcohol needed is based on the polybasic acid constituent. This type of procedure is known in the art as "monoglyceride process."

ETHYL CELLULOSE

The ethyl cellulose used in this process is marketed by the suppliers with varying ethoxy contents. The lowest ethoxy content is in the neighborhood of 43.5, whereas the highest ethoxy content runs up to 50. These figures are per cents. The viscosity ranges of the commercial grades range from 6.5 cps. to 200 cps. in 5% solutions prepared in a mixture of 70 parts of toluene and 30 parts of ethanol or in a mixture of 80 parts of toluene and 20 parts of ethanol.

The various grades differ in physical properties and in their compatibility with resins and plasticizers.

For the purposes of this process the higher ethoxy content grades show faster dissolution properties, than the lower ethoxy grades. For instance, a 48.5–50% ethoxy content product reaches faster the point of clarity in the reaction, than the other grades with lower ethoxy contents.

REACTION CONDITIONS

The alkyd resin component of the resin formed by this process is a short oil alkyd resin. The polybasic acid polyhydric alcohol ester portion of such alkyd resin is at least 45% but preferably not less than 50%. In many instances this portion is 60% or 70% and may go up as high as 75%. (All percents in this specification are percents by weight.)

The polyhydric alcohol-fatty acid ester portion of the short oil alkyd resin does not exceed 55%, is preferably not more than 50%, and may be as low as 25%.

The fatty acids may be drying fatty acids, which yield air drying or semi-drying short oil alkyd resins, or non-drying fatty acids, like e. g. the fatty acids of cocoanut oil or of castor oil.

The nondrying short oil alkyds are generally preferred for combinations with urea or melamine resins, because they yield better aging films than drying short oil alkyds. The latter form dry films in absence of the urea resins too and their films embrittle with age, whereas the non-drying short oil alkyds are fairly permanent plasticizers of the urea or melamine resins.

Alkyd resins are made according to various processes. In most cases the fatty acids, polybasic acids or anhydrides and the polyhydric alcohols are charged simultaneously into the reactors. In some instances some of the ingredients are added gradually during the reaction to the other ingredients already in the reactor. If oils, other than castor oil are used in the preparation of the alkyd resins instead of their fatty acids and glycerine is used as polyhydric alcohol, the so called "monoglycerine process" is used, which consists in heating the oil and glycerine together, preferably in the presence of a catalyst, until the monoglycerine is formed and/or until the reaction product becomes alcohol miscible. At this stage the phthalic anhydride is added and the mixture further heated.

To incorporate the ethyl cellulose into the short oil alkyd resins, it was found necessary to add the ethyl cellulose at a stage to the alkyd resin ingredients, at which a substantial portion of the ingredients is still unreacted. Therefore the ethyl cellulose may be added (1) with those ingredients of the alkyd resin which are first to be charged into the reactor, (2) or simultaneously with the last to be added ingredient, (3) or it may be added as the last ingredient to be charged into the reactor. But in each of these cases the ethyl cellulose is added at a stage where a substantial part of the reaction mixture is still in an unreacted state.

The ethyl cellulose, according to this process, is heated together with the other ingredients of the alkyd resin, to secure compatibility and co-condensation of the cellulose ether and the alkyd resin ingredients. The temperature range required for this process is above the melting point of the ethyl cellulose and it exceeds in most cases 160° C. If the solvent process is used to make the alkyd resins 180° C. is a good temperature and the reaction temperature may go as high as 185° to 205° or 210° C. If the alkyd resin is prepared in the absence of solvents, temperatures considerably higher may have to be employed, ranging up to 250° C. or even somewhat still higher, such as e. g. 270° C.

As the esterification of the alkyd resin ingredients runs parallel to the co-condensation with the ethyl cellulose, the specifications, which a resin has to meet, may necessitate that the mixture be heated until a desired acid number or a desired viscosity is reached. In each event the heating is continued until a clear resin results, which in turn forms clear solutions and clear films, proving compatibility of its components.

EXAMPLES

The process is illustrated here below on phthalic anhydride alkyds, which are modified by non-drying oil fatty acids. The process is not limited to the examples or to the resins produced in the examples.

Example 1

260 grams of glycerine
415 grams phthalic anhydride
225 grams of cocoanut oil fatty acids were weighed into a laboratory beaker and heated to 450° F. and held at this temperature for 30 minutes, to cause initial condensation. 202 grams of ethyl cellulose 10 cps. 48% ethoxy content grade were added to the reaction mixture, and the heating was continued until solubility occurred. The ethyl cellulose addition cooled the batch and the same was reheated to 400° F. No sign of solubility could be observed at that temperature. The temperature was raised to 410° F. at which there was some indication of solubility. The temperature was raised to 420° F. at which the viscosity of the mixture started to become lower. The temperature was further raised to 450° F. At this stage darkening of the resin occurred and a sample pill, placed on a glass plate, was still cloudy. The temperature was increased to 540° F. at which the pill became clear. Considerable foaming was observed. The resin obtained had a dark color. The resin was cooled and thinned to 60% solids with a petroleum base aromatic hydrocarbon with a boiling range similar to xylol and marketed by Standard Oil Company of New Jersey.

Example 2

The product of Example 1 was mixed with a butyl modified urea formaldehyde resin dissolved in a mixture of butyl alcohol and xylol in a proportion of 1 part of modified alkyd solids to 1 part of urea solids. 1% of butyl phosphoric acid was added as catalyst, based on total resin solids and the mixture was thinned to 40% solid content with a petroleum base aromatic hydrocarbon with a boiling range similar to xylol and marketed by Standard Oil Company of New Jersey.

The mixture was allowed to stand over night and films were prepared. Some of the films were left to air dry at room temperature. These were dried over night but gave a slight tack under pressure of the thumb. Another set of films was baked for 1 hour at 140° F. and yielded a very tough and hard film with good physical and chemical properties.

Example 3

Example 1 was repeated with two changes: (1) a $CO_2$ blanket was used over the reaction mixture and (2) the reaction temperature was lowered. The alkyd ingredients were heated to 450° F. in 40 minutes and held for 30 minutes. The ethyl cellulose was added and the temperature dropped to 400° F. The temperature was raised again to 480° F. and held for 40 minutes. The color of the mixture darkened rapidly at the high temperature. Clear and dark resin was obtained after the heating was over. This resin was thinned to 50% solids with a petroleum base aromatic hydrocarbon with a boiling range similar to xylol and marketed by Standard Oil Company of New Jersey.

Example 4

225 grams of cocoanut oil fatty acids, 202 grams of ethyl cellulose and 25 grams of glycerine were charged into a laboratory beaker and heated to 400° F. and held there for 15 minutes. 235 grams of glycerine were then added, followed by 415 grams of phthalic anhydride. The temperature dropped to 340° F. and the reaction mixture was reheated to 450° F. within 20 minutes and held at that temperature for 1 hour. After all ingredients were in at 380° F. severe foaming occurred. At 420° F. the color started to darken. At the end of the cook a dark but clear resin was obtained, having somewhat similar properties to that of Example 1.

The resins of Examples 1, 3, and 4 have about 28% oil content in the solid resin.

Example 5

Example 4 was repeated with the only variation in reaction conditions, that the cooking temperature was lowered to 400° F. The batch was held for 2½ hours at 400° F. Acid number determinations were made each half hour. The first acid number was 106.5, second acid number was 78.0, third acid number was 45, and the fourth acid number was 41.5. The last acid number was not taken, because of the darker color caused difficulties in reading the color change of the indicator. Color was somewhat lighter, than in Example 4. The resin was clear and formed a clear solution in a petroleum base aromatic hydrocarbon with a boiling range similar to xylol and marketed by Standard Oil Company of New Jersey, when thinned to 50% solids.

Example 6

Example 5 was repeated, using 1% of paraphenyl phenol, based on the weight of the ethyl cellulose. This agent is known to preserve ethyl cellulose against decomposition at elevated temperatures. A good resin was obtained, with little change in color, when compared with the resin of Example 5.

SOLVENT PROCESS

One of the methods used in alkyd resin manufacture is the so called solvent process. It was found, according to the art, that it is highly advantageous to prepare alkyd resins in the presence of organic solvents. The apparatus suitable for this purpose may be described as follows:

A five liter three neck flask is charged with the various ingredients of the oil modified alkyd resin to be prepared. One of the necks contains a thermometer which immerses into the reaction mixture and permits the reading of the temperature of same. If the addition of an inert gas is required, such as $CO_2$, this may be introduced through the same neck as the thermometer. The center neck is used to provide an agitator, which is preferably glass or stainless steel. A mercury seal excludes contact with the outside atmosphere. The third neck is provided with a side arm tube which is tilted slightly upward. This tube connects with a trap which has a capacity of about 400 to 500 cc. This trap is vertical and is calibrated in the lower 350 cc. portion. The upper portion of the trap is connected with a reflux condenser, which is jacketed and water cooled. The lower end of the trap has a stockcock, permitting the discharge of the contents of the trap when desired. The five liter flask is conveniently heated with an electric heater, suitable to heat round bottom flasks. In addition to the alkyd resin components, a larger or smaller quantity of solvent is present in the reaction mixture. The solvent used has the property of distilling simultaneously with water and to be immiscible with water. When the temperature is raised the solvent starts to boil and while distilling carries over water into the reflux condenser. Both the organic solvent and the water are condensed simultaneously. They flow back into the trap, and because of their immiscibility and difference in specific gravity separate in the trap. As the solvents used are lighter than water, the water collects in the lower part of the trap and the solvent flows back into the reaction chamber, thereby providing for a continuous refluxing operation. The trap is filled before the reaction starts with the same solvent as used in the reaction mixture up to the point of flowback. As more and more water of esterification collects in the trap, more and more solvent is entering the reaction mixture in form of flowback. Therefore in calculating final solvent content, the quantity of solvent has to be considered, which is displaced by the water of esterification, the quantity of which in turn is measured by the calibrated portion of the trap.

The boiling point of the solvent and its quantity regulates the reaction temperature of the resin forming process. If the quantity of solvent is kept constant and solvents with varying boiling points are used, the higher boiling point solvents will yield higher reaction temperatures and the lower boiling point solvents lower reaction temperatures. On the other hand, if one single solvent is used in varying quantities, the less solvent is used the higher the reaction temperature and the more solvent used the lower the reaction temperature. Therefore, by proper selection of the solvent and its proportion to the other ingredients, the reaction temperature can be greatly varied.

According to this invention the solvent process, if properly applied, lends itself very advantageously to incorporate ethyl cellulose into short oil alkyd resins and to secure compatibility both of the components of such a modified alkyd resins, and its mixtures with organic solvent soluble urea or malamine resins.

In the examples here below, the solvent process is demonstrated on a short oil castor oil alkyd resin, having 40% castor oil content and 60% glycerol phthalate content. This resin has been selected to illustrate the process conveniently, without the necessity of listing a very large number of examples. The process, however, is not limited to these illustrative examples. It can be applied to other short oil non-drying or drying oil alkyds. In the examples here below, the quantity of ethyl cellulose has been selected to yield on 100 parts alkyd resin 5%, 9½%, 10%, 15% and 25% ethyl cellulose content, respectively.

*Example 7*

The following materials were used in this example:

| | Grams |
|---|---|
| Glycerine 98% | 757.4 |
| Castor oil AA (raw) | 1246.8 |
| Phthalic anhydride | 1284.2 |
| | 3288.4 |
| Expected water of esterification | 171.4 |
| Expected alkyd yield | 3117.0 |
| Expected alkyd yield as hereinbefore described | 3117.0 |
| Ethyl cellulose 7 cps. 48.5% to 49.5% ethoxy content | 156. |
| Solvent mixture | 233. |
| Theoretical yield | 3506. |

This example is formulated to yield 5% ethyl cellulose on 100 parts of alkyd resin and the solvent mixture was 7½% based on the alkyd resin component alone. As solvent mixture a mixture of 80% xylol and 20% n-butyl alcohol was used (percents by weight).

All the ingredients of the alkyd resin and the ethyl cellulose were charged into the flask together with 87 grams of solvent mixture. The rest of the solvent mixture entered the flask gradually from the trap as the water of esterification replaced the solvent in the trap. One hour after the heating was started, the temperature reached 168° C. and the first drop of water was collected in the trap. The reaction temperature, during the major portion of the reaction of the temperature was between 190 and 200° C. and it reached 204° C. at the end of the reaction. Final water collected in trap was about 177 cc. and the total heating time, after the first drop of water came over, was 2 hours. The yield was 3,502 grams. The resin obtained had a light color and was clear and had an acid number of 29.1. The resin blend became clear at 195° C. 45 minutes after the first drop of water came over and at a point where 103 cc. of water was collected. In this type of resin, more water is formed than anticipated, which may be partly due to some water content of the butyl alcohol, or to some dehydration of the castor oil, or it may be formed as a byproduct of the condensation of the ethyl cellulose with the alkyd resin components. The color of the resin was very nicely light.

*Example 8*

The same alkyd resin ingredients were weighed into the flask as in Example 7. The ethyl cellulose quantity, however, was raised to 296.8 grams to represent 9½% of the theoretical alkyd resin yield. 311 grams of solvent mixture were used in this instance, and 165 grams of same were weighed into the flask at the beginning of the reaction. This resin had 9½% ethyl cellulose for each 100 parts of short oil alkyd and the solvent quantity represented 10% of the alkyd resin component, excluding the ethyl cellulose. The first drop of water came over into the trap 1½ hrs. after the heating was started at a temperature of 158° C. The total reaction time from that point on took 3 hours and 45 minutes. The temperature during the major part of the reaction was between 175 and 193° C. The total quantity of water collected was 185 cc. The resin became clear 1 hour and 45 minutes after the first drop of water came over at a temperature of 185° C. and at a point when 107 cc. of water were collected in the trap. The acid number of the solid resin was 29. The color was light, with a brownish tint.

*Example 9*

In this example the quantity of glycerine, castor oil and phthalic anhydride has been reduced with 20%, i. e. only 80% of the weights used in Examples 7 and 8 were weighed into the flask. The reason for this action was to provide a larger space for increased ethyl cellulose and solvent content and to leave ample room for foaming, which could be observed in the early stages of the reaction. 15% ethyl cellulose was used in this example, based on the expected alkyd resin yield. The grade used was 15 cps. ethyl cellulose, with 48.12% ethoxy content. The quantity of the solvent mixture was such as to provide 15% of solvent based on the combined weight of the expected alkyd resin yield and ethyl cellulose. The quantity of solvent in this example was much higher than in Examples 7 and 8. 2,494 grams was the expected alkyd resin yield; 374 grams of ethyl cellulose were used and 430 grams of solvent mixture was added. Part of the solvent mixture was introduced into the flask at the beginning of the reaction. The remaining part of the solvent entered the flask from the trap during the reaction.

Because of the larger quantity of solvent present, the reaction temperature was lower in this example and the reaction time was longer. Heavy foaming was observed in the early phases which necessitated discontinuance of heating for short periods from time to time. The first drop of water was obtained 1½ hours after the heating started at a temperature of 145° C. For about 40 minutes bad foaming was observed. After this time lapsed the foam was under control and refluxing started. At that point the temperature was 147° C. and 20 cc. of water were collected. The refluxing became satisfactory only about 2 hours after the first drop of water came over and the temperature at that time was 164° C. and the collected water 58 cc. Heating was continued for another four hours during which time the temperature reached 173° C. and the total water collected was 127 cc. The batch was cooled and an acid number determination was made, showing an acid number of 43, based on the solid resin. The next day the batch was reheated. The mixture reached 173° C. 2½ hours after the heating was started and the collected water was 138.5 at that time. Heating was continued for a further hour and it was decided to let out from the trap 50 cc. of water which meant that 50 cc. of solvent had been drawn off the reaction mixture to raise the temperature. The reaction mixture was still cloudy at this point. During the next hour the temperature reached 179.5 and the total collected water, including the portion left out from the trap, was 152 cc. At this point another 50 cc. of water were removed from the trap and the heating continued for another three hours. The temperature reached 190° C. and the total water collected was 168.5. The resin cleared in about 40 minutes after the second 50 cc. of water were removed from the trap. The resin was clear at the reaction temperature, but because it showed cloudiness when poured on a glass plate, the heating was continued next day for another 3 hours between the temperatures of 190 and 196° C. The resin had a total reaction time of 4 hours between 185° and 196° C. The yield was 3,191 grams with a solid content of 88%. The acid value of the solid resin was 0.7 and the total water collected 178 cc. The resin had a medium light color of a brownish tint.

Example 10

The glycerine, phthalic anhydride and castor oil quantity in this resin was reduced further. The weights applied were 20% less than in Example 9. The theoretical yield of the resin was 1,999 grams. 499 grams of ethyl cellulose 7.3 cps., 48.12% ethoxy content, was added to the reaction mixture and the total solvent used was 624 grams, representing 25% of the combined weight of theoretical alkyd yield and ethyl cellulose. The ethyl cellulose was 25% for each 100 parts of theoretical alkyd yield. 5 grams of menthyl phenol were added to the reaction mixture to preserve the ethyl cellulose, i. e. to retard its decomposition at the high temperature and during the prolonged heating (1% base on the ethyl cellulose present). Larger quantity of solvent was used to procure easier swelling of the ethyl cellulose in the early part of the reaction and portions of the solvents were released during the reaction from the trap, to decrease the solvent content in the reaction mixture and to increase the reaction temperature. The first drop of water came over 1 hour and 40 minutes after the heating was started at a temperature of 132° C. 1 hour and 15 minutes later 74 cc. were discharged from the trap containing 25 cc. of water and 49 cc. of solvent. At this point the temperature was 149° C. During the next hour the temperature rose to 162° C. and 26 cc. of additional water was evolved, which was discharged from the trap together with an additional 23 cc. of solvent. During the next hour and a half the temperature rose to 168° C. and another 25 cc. of water was collected. This was discharged from the trap together with 25 cc. of solvent. During the next hour the temperature rose to 174° C. and 9 cc. of solvent were collected. At this stage, the batch was cooled and reheated next day. In about an hour and a half, after the reheating started, the temperature reached 171° C. and the water collected was 16 cc., which was discharged from the trap together with an additional 36 cc. of solvent. During the next half hour the temperature rose to 179° C. and 6 cc. of water were collected which were discharged from the trap together with 64 cc. of solvent. During this stage the resin was still cloudy. During the next hour the temperature rose to 184° C. and 11 cc. of water was collected, which was discharged from the trap together with 28 cc. of solvent. During the following 50 minutes, the temperature rose to 187° C. and 7 cc. water collected. This water was discharged from the trap together with 20 cc. of solvent. At this stage, the resin became clear and the temperature was 190° C. The heating was continued for another 3 hours with a final temperature of 195° C. Another 50 cc. of water was collected. After this time lapsed, the heating was stopped. The total water collected was 130 cc. The solvent removed was 247 cc. The solvent quantity remaining in the kettle was 502 cc. The solid content of the final resin was 85.35% and the yield was 2,952 grams. The acid number of the solid resin was 10.8. The resin had a brown color. The total reaction time between 190–195° C., after the resin became clear, was three hours.

Example 11

Example 8 was repeated with the following changes: The quantity of glycerine, castor oil and phthalic anhydride were reduced by 10%, to provide for more room above the reaction mixture. The glycerine used was 96% strong and therefore adjustment was made in the quantity used. 10% ethyl cellulose, of 100 cps., 48.5% to 49.5% ethoxy content grade, was used, based on the expected alkyd resin yield. The solvent mixture was the same as in Example 8, without any reduction that is 10% of the combined weight of expected alkyd yield and ethyl cellulose. The expected alkyd yield was 2,806 grams, the ethyl cellulose was 281 grams and the solvent mixture 311 grams, out of which 146 grams were charged into the flask. The use of the high viscosity ethyl cellulose caused some difficulty in the foaming during the initial period of the reaction. The first drop of water was obtained at 160° C. 1½ hours after the heating started. For the next hour and a half the temperature remained low and towards the end of this period the refluxing improved after the foaming subsided. At this point the temperature was 147° C. and the total water collected was 3 cc. In the next hour the temperature rose to 162° C. and 47 cc. of water was collected. 45 minutes later the resin became clear at a temperature of 184° C. and at a collected water of 102 cc. The reaction was continued for another hour and 55 minutes. The highest temperature obtained was 193° C. and the collected water was 172 cc. The heating was resumed next day and proper refluxing was obtained 2 hours after the reheating was started. The heating was continued, for another 1½ hours during which time the highest reaction temperature was 201° C. towards the end of the reaction and the total collected water was 200 cc. The total yield was 3,277 grams. The total reaction time above 175° C. was 3½ hours.

The resin had 90.5% solids and the acid number of the solid resin was 16. The color was medium brown.

Example 12

This example was a repeat of Example 11 with the only difference that at 7 cps. ethyl cellulose was used, with the same ethoxy content as in Example 11, and 2% of p-phenyl phenol, based on the ethyl cellulose. The first water was obtained 2 hours after the heating started at a temperature of 145° C. Foaming continued for another 1½ hours at which time the temperature was 178° C. and 82 cc. of water were collected. The resin became clear ½ hour later at a temperature of 184° C. and with 104 cc. water collected. The heating was continued for another 3 hours yielding at the end of the reaction 193° C. and the total water collected in the trap was 193 cc. The resin had an acid number of 21.7 based on the solids and had about 90% solid content. The color of the resin was fairly light with a somewhat brownish tint. The 193 cc. water reacted slightly acid and took 9.5 cc. 1/5 normal NaOH solution to neutralize it. The expected final yield was 3,403.5 grams and the actual yield was 3,400 grams.

*Example 13*

Example 8 was repeated exactly with the only change that 2% of menthyl phenol was added, based on the ethyl cellulose as stabilizer. A 96% strong glycerine was used instead of 98%. The resin was similar to that of Example 8 and had a fairly light color.

*Example 14*

Example 8 was repeated, using 9 cps. ethyl cellulose with a high ethoxy content. An ethyl cellulose was used with a 49.3% ethoxy content, manufactured by Hercules Powder Co. The first drop of water was collected in the trap about 2 hours after the heating started. The temperature was 141° C. at this point. Because of foaming the temperature was raised slowly. Refluxing became continuous after further 2¼ hours at a temperature of 170° C. and with 63 cc. collected water in the trap. The resin was still somewhat cloudy at this point. The reaction mixture became clear after another 45 minutes lapsed, the temperature being 185° C. at this point, with 107 cc. water collected in the trap. The reaction was continued for another 3½ hours, towards the end of which the temperature rose to 196° C. The total quantity of water collected was 220 cc. The acidity of the total water could be neutralized with 5 cc. of 1/5 N. NaOH. The yield was 3.733 grams. The resin had 90.1% solids and the solid resin had an acid number of 16.8. The color was yellow with a brownish tint.

*Example 15*

Example 10 was repeated by using as solvent mixture a mixture of 20% amyl alcohol and 80% high flash naphtha, per cent by weight. High flash naphtha is a high boiling coal tar solvent. The first drop of water came over at 175° C. 1 hour after the heating was started. The heating was continued for 2 hours and 45 minutes during which time 170 cc. water was collected in the trap. The temperature reached 214° C. and was most of the time above 200° C. The resulting resin had an acid number of 9.5 based on the solids, and when thinned to 60% solids with xylol had a viscosity of Z on the Gardner scale. The color was light. $CO_2$ gas was introduced into the flask above the reaction mixture to form a blanket. The temperature has been increased by using a solvent mixture with a higher boiling point.

*Example 16*

The resins of Examples 7, 8 and 9 were tested in admixture with a commercial butyl modified urea-formaldehyde resin, containing 50% nonvolatile content and containing as thinners 30% of butyl alcohol and 20% xylol. Equal parts of modified alkyd solids were mixed with the urea solids. The resins were dissolved in organic solvents and had 50% solid content. These mixtures were tested on wood as wood finishes.

In one series 1 part of n-propyl phosphate was added as catalyst to 100 parts of combined alkyd-urea solution.

2 coats of catalyst containing resin solution were applied by brush on plywood panels. The panels were left at room temperature for 20 minutes and then baked in an oven at 140° F. (60° C.) The first coat was baked for 1 hour and the second coat for 1½ hours. A comparative test was carried out with a similar short oil alkyd resin, which did not contain ethyl cellulose.

The resins containing ethyl cellulose formed harder films, than the alkyd free of ethyl cellulose. The product of Example 8 was exceptionally good with regard to rubbing properties and mar-proofness. It did not gum up the sand paper, sanded easily and readily. Also the other ethyl cellulose containing resins behaved satisfactorily.

In another series the same catalyst containing resin mixtures were brushed on plywood panels, but these panels were left at room temperature. 4 hours lapsed between application of the first coat and of the second coat. After overnight drying at room temperature the ethyl cellulose containing resins formed dry films, whereas the control resin, which had no ethyl cellulose, formed a tacky film, which printed readily. 48 hours after application the finish containing the product of Example 9 was hard and mar-proof and best of the series. Example 7 yielded a finish next best and Example 8 was satisfactory too. The control resin yielded a film which marred readily.

In a third series no catalyst was added and baking of the coatings was carried out as in the first series, hereabove mentioned. The ethyl cellulose containing resins yielded also in this series satisfactory results. They required somewhat longer baking, than with catalyst, but cured faster than the control resin.

In a fourth series the catalyst was reduced to one half, one fourth and one tenth of the quantity used in the first mentioned series. It was found, that the ethyl cellulose containing short oil alkyds require much less catalyst to cure fully, than control resins of similar constitution, but free of ethyl cellulose.

In a fifth series the first series were repeated, but the modified alkyd proportion was increased to form proportions 1:2 and 1:3 with 1 part of urea resin. These films were more elastic than the films of the 1:1 ratio, but the ethyl cellulose containing resins formed harder films than the control resin which did not contain ethyl cellulose.

In conclusion it may be said, that when mixed with urea resins, the ethyl cellulose modified short oil alkyd resins show the following advantages in comparison with similar short oil alkyds which are free of ethyl cellulose:

The ethyl cellulose modified short oil alkyds (1) Cure faster,
(2) Cure with less catalyst,
(3) Cure at lower temperature (even at room temperature),
(4) Form harder films,
(5) Form tougher films, (6) Form better sanding films, and
(7) They could be added to urea resins in larger proportions, without appreciably reducing surface hardness and toughness.

The ethyl cellulose modified short oil alkyd resins of this specification form clear mixtures with butyl modified or other organic solvent soluble urea and melamine resins. Many of the above listed advantages could be observed also in admixture with melamine resins.

The quantity of ethyl cellulose ranges in this process from ½ part by weight upward for each 100 parts of calculated short oil alkyd resin yield. The upper limit may be as high as 50 parts of ethyl cellulose for each 100 parts of alkyd resin. 5 to 25 parts of ethyl cellulose is an advantageous range.

The lower curing temperature and other advantages shown in Example 15 for the modified short oil alkyd resins of this process make these resins exceptionally adaptable as furniture finishes and wood finishes in general, in combination with organic solvent soluble urea formaldehyde and melamine formaldehyde resins. They show favorable cold checking resistance and the cold check cycles are very high.

Another advantageous use of the modified short oil alkyd resins of this process is, in combination with urea and melamine aldehyde resins, in textile printing inks. Such inks are liked by the textile printing trade. However, their high curing temperature limits their use. Textile plants have plenty of saturated steam available, but the curing temperatures of urea and melamine aldehyde resins require temperatures which could only be obtained by superheated steam or electrical or gas heat. This means special installation, which is always expensive and at certain places impractical. The low temperature curing time and the fast cure of the resins of this process enable printing inks, formulated therewith, to cure at temperatures readily obtainable with saturated steam.

If drying oil fatty acids are used in the short oil alkyd resin component of the resins of this process, tougher, faster drying and harder drying resins are obtained. These resins may be used alone or in combination with urea and melamine aldehyde resins, to yield coating compositions.

In the above examples para-phenyl phenol and menthyl phenol were mentioned to improve stability of ethyl cellulose. The following materials are known also to improve stability of ethyl cellulose: diphenylamine, phenyl-beta-naphthylamine, dicyclohexylamine, symmetrical di-beta-naphthyl-p-phenylenediamine, diphenylguanidine, ortho-tolylbiguanide, phenyl methyl pyrazolone, carbazole, hydroquinone monobenzyl ether, hexyl catechol, benzyl catechol, para-tertiary butyl catechol, syringic acid, gallic acid, vanillyl alcohol.

In this specification the expression is used, that the ethyl cellulose is added to the alkyd resin ingredients at a stage when a substantial portion of these ingredients is still unreacted. It is hard to express numerically what this substantial portion is, as there are many types of alkyd resins with varying saponification number, which all are members of the class of short oil alkyds. The initial acidity differs also in accordance with the fact whether the monoglyceride process is used or the fatty acid process in making the alkyd resins. It may be safely said, that the acid number of the mixture of the alkyd resin ingredients at the point of the ethyl cellulose addition should be at least one third of the saponification number of the alkyd resin component to be formed. This means that the esterification should not be more progressed than to two thirds of the total. In most cases the acid number of the mixture to which the ethyl cellulose is added is at least 100 at the point of the addition of the ethyl cellulose and in many instances the ethyl cellulose is added before the heating is started.

The constants of the products of the solvent process examples are given here below. The viscosities were determined at 50% solids, using 2% butyl alcohol (normal) and 48% xylol as solvents. Both the viscosities and the color of these solutions has been determined according to the respective Gardner scale.

| Example Number | Viscosity | Color | Stabilizer | Acid No. | Ethyl cellulose Percent | Ethyl cellulose Cps. |
| --- | --- | --- | --- | --- | --- | --- |
| 7 | H | 6 | none | 29.1 | 5 | 7 |
| 8 | I | 7 | do | 29.1 | 9½ | 7 |
| 9 | P | 10 | do | 0.7 | 15 | 15 |
| 10 | U | 17-18 | menthol phenol | 10.8 | 25 | 7.3 |
| 11 | H | 13-14 | none | 16.0 | 10 | 100 |
| 12 | F | 11-12 | p-phenyl phenol | 21.7 | 10 | 7 |
| 13 | O | 13-14 | menthol phenol | 29.5 | 9½ | 7 |
| 14 | J | 14 | none | 16.0 | 9½ | 9 |

I claim:

1. The process of preparing ethyl cellulose modified short oil alkyd resins consisting of an alkyd resin component and an ethyl cellulose component, which comprises (1) mixing a polyhydric alcohol, a polybasic organic carboxylic acid, a compound chosen from the group consisting of naturally occurring fatty acids and glycerides thereof, and ethyl cellulose, the proportions being such that the resulting alkyd resin component consists of from 45% to 75% of polyhydric alcohol ester of polybasic organic carboxylic acid and from 55% to 25% of polyhydric alcohol ester of naturally occurring monohydric fatty acids, and that the ethyl cellulose of the ethyl cellulose component is present in the amount of from 0.5 to 50 parts per 100 parts of the formed alkyd resin component and (2) heating said mixture under reflux in the presence of from 3% to 25% of water insoluble organic solvent, based on the calculated yield of the modified alkyd resin, at a temperature of from 175° C. to 210° C., until a resin is formed having an acid number not exceeding 29.5, provision being made for separation of the water of esterification before the distilled and condensed solvent is allowed to return to the reaction zone.

2. The process of claim 1, in which the ethyl cellulose component ranges between 5% and 25% of the alkyd resin component.

3. The process of claim 1, in which the ethyl cellulose component does not exceed 15% of the alkyd resin component.

4. The process of claim 1, in which said polyhydric alcohol is glycerine and said polybasic organic carboxylic acid is phthalic anhydride.

5. The process of claim 1, in which the said solvent consists of a mixture of 20% butyl alcohol and 80% xylol.

6. The process of claim 1, in which the said solvent consists of a mixture of 20% amyl alcohol and 80% high flash naphtha.

7. The process of claim 1, in which the ethyl cellulose is at least of 48% and not more than of 50% ethoxy content.

8. The process of claim 1, in which in the alkyd resin component the monobasic acids are acids of non-drying oils.

9. The process of claim 1, in which in the alkyd resin component the monobasic acids are castor oil fatty acids.

10. The process of claim 1, in which in the alkyd resin component the monobasic acids are coconut fatty acids.

11. The process of claim 1, in which in the alkyd resin component the monobasic acids are acids of oils which are at least semidrying.

12. A blend of the product of the process of claim 1 and an organic solvent soluble aldehyde resin, which is a member of the class of urea formaldehyde and melamine formaldehyde resins, said blend yielding clear films.

13. A blend of the product of the process of claim 1 and an organic solvent soluble aldehyde resin, which is a member of the class of urea-formaldehyde and melamine-formaldehyde resins, in which for each one part by weight of aldehyde resin, there are 1 to 10 parts by weight of the product of the process of claim 1 present, said blend yielding clear films.

LASZLO AUER.

REFERENCES CITED

The following references are of record in the file of this patent:

UNITED STATES PATENTS

| Number | Name | Date |
|---|---|---|
| 2,022,011 | Sly | Nov. 26, 1935 |
| 2,218,474 | Moore | Oct. 15, 1940 |
| 2,243,185 | Bacon et al. | May 27, 1941 |

FOREIGN PATENTS

| Number | Country | Date |
|---|---|---|
| 610,556 | Germany | Mar. 12, 1935 |

OTHER REFERENCES

Ethocel Handbook, Dow Chem. Co., 1940, page vii.

Hodgins et al.: Ind. and Eng. Chem., pp. 512-515, April 1941.